May 11, 1954 J. B. ATWOOD 2,678,385
DIVERSITY RECEIVER
Filed April 16, 1951 3 Sheets-Sheet 1
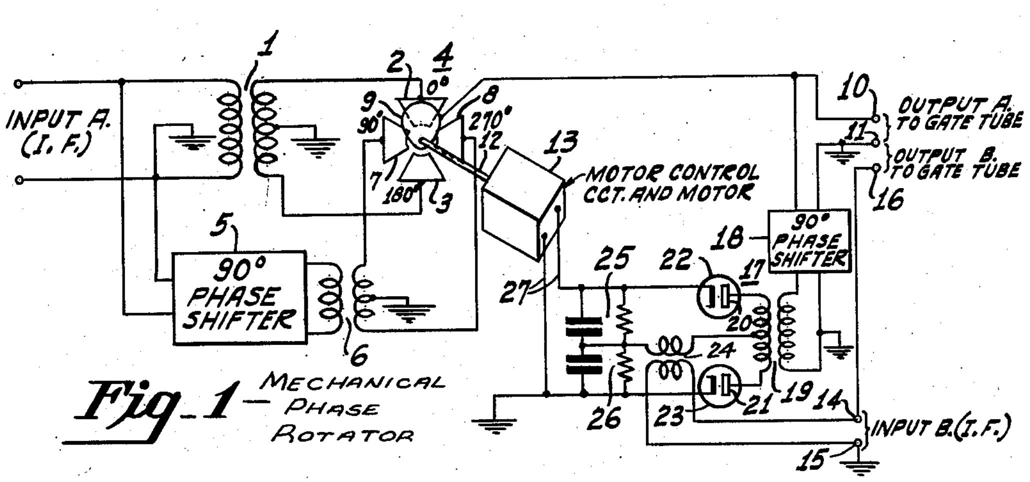
Fig-1- MECHANICAL PHASE ROTATOR
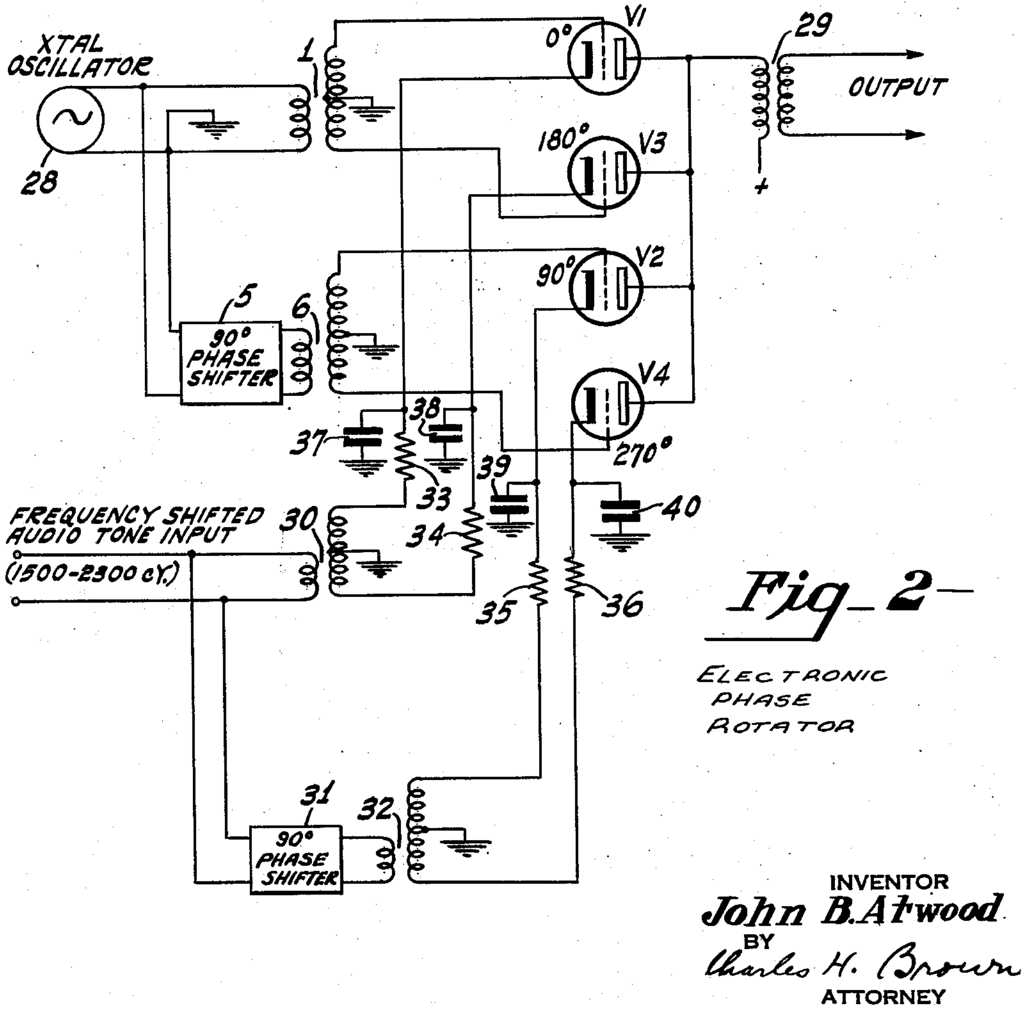
Fig-2- ELECTRONIC PHASE ROTATOR
INVENTOR
John B. Atwood
BY
Charles H. Brown
ATTORNEY May 11, 1954 J. B. ATWOOD 2,678,385

DIVERSITY RECEIVER

Filed April 16, 1951 3 Sheets-Sheet 2

INVENTOR
John B. Atwood
BY
Charles H. Brown
ATTORNEY

May 11, 1954 J. B. ATWOOD 2,678,385

DIVERSITY RECEIVER

Filed April 16, 1951 3 Sheets-Sheet 3

INVENTOR
John B. Atwood
BY
Charles H. Brown
ATTORNEY

Patented May 11, 1954 2,678,385

UNITED STATES PATENT OFFICE 2,678,385

DIVERSITY RECEIVER

John B. Atwood, Riverhead, N. Y., assignor to Radio Corporation of America, a corporation of Delaware Application April 16, 1951, Serial No. 221,184

4 Claims. (Cl. 250—20)

This invention relates to an electronic phase rotator, and particularly to a phase rotator having especial utility in a transmitter for radio frequency carrier shift (RFCS) radiophoto signals, in a transmitter for frequency shift keyed (FSK) telegraph signals, or in a diversity receiver system for receiving these types of signals. Although the phase rotator of this invention will herein be described as a component of transmitters or receivers for signals of the foregoing types, the phase rotator of this invention may have utility in other arrangements.

In a transmitter for RFCS radio photo signals, it is important, from an operational standpoint, that there be no operating controls or conversions at the transmitter which could cause the frequency shift at the transmitter output to differ from the frequency shift supplied from the radiophoto machine. In the machine, the frequency shift from a reference frequency, which corresponds to white in the picture being transmitted by the machine, corresponds to gradations from white to black of each elemental picture area. If it is known that there are no controls on either the transmitter or the receiver which can change the shift, the operator at the receiving central office knows that any improper shift received could be caused only by the transmitting radiophoto machine and he can advise the transmitting machine operator to adjust his machine to correct the shift. However, if either the transmitter or the receiver can change the shift, it would be a lengthy process to determine whether the source of an improper shift was in the transmitting radiophoto machine, the transmitter, or the receiver.

As far as the RFCS radiophoto receiver proper is concerned, certain receiver arrangements, utilizing heterodyne methods, have been devised which have no operating controls which could change the frequency shift. An example of such an arrangement is disclosed in my copending application, Serial No. 118,618, filed September 29, 1949. Said application ripened on January 6, 1953 into Patent #2,624,834. However, insofar as the transmitter is concerned, prior usage has provided operating controls and conversions which could change the frequency shift. This usage has been to change the FM tones, produced by the transmitting radiophoto machine, to variable amplitude direct current voltages (by means of a so-called tone signal converter) and then to utilize the direct current voltages so produced to control a reactance tube in a transmitter unit to shift the transmitter frequency. Either or both of these conversions can change the frequency shift, so that the shift at the output of the transmitter can differ from the shift supplied from the radiophoto machine.

Therefore, an object of this invention is to devise a transmitter arrangement for RFCS radiophoto signals in which there are no conversions or operating controls which could cause the frequency shift at the output of the transmitter to differ from the frequency shift supplied from the radiophoto machine.

Another object is to reduce and also simplify the equipment utilized in an RFCS radiophoto transmitter.

A further object is to provide a novel electronic phase shifter which is fast-acting and capable of responding to very rapidly-occurring phase changes.

Yet another object is to devise a novel FSK telegraph transmitter.

Another object is to provide an FSK telegraph transmitter in which the desired frequency shift can be very easily and simply set up.

In a diversity receiver for RFCS radiophoto signals, one problem which must be solved is the provision of a switching system which produces diversity action without introducing switching transients. In a radiophoto receiver, such switching transients show up on the picture as either white or black dots and may be numerous enough to make the picture unsatisfactory. Such transients may be thought of as disturbances of short duration as compared to normal steady-state conditions and occur if the two intermediate frequency (IF) inputs to the switch are out of phase when switching occurs. The phase changes occurring at the time of diversity switching, resulting from the out-of-phase relation at such time of the two signals being switched, correspond to momentary frequency changes, which show up on the picture as either black or white dots, since the picture receiver is frequency-responsive. I have found that diversity switching can be accomplished without introducing switching transients, by switching of IF signals when the two inputs to the switch are in phase.

Accordingly, another object of this invention is to provide, in a gated or switched diversity receiver, an arrangement which will keep the two IF inputs to the switch or gate in phase at all times.

A still further object is to devise a diversity switching system which produces diversity action without introducing switching transients.

The foregoing and other objects of the invention will be best understood from the following description of some exemplifications thereof, reference being had to the accompanying drawings, wherein:

Fig. 1 is a representation of a mechanical phase rotator, illustrating certain features of the invention;

Fig. 2 illustrates an electronic phase rotator of this invention, used in an RFCS radiophoto transmitter;

Figures 3, 5:
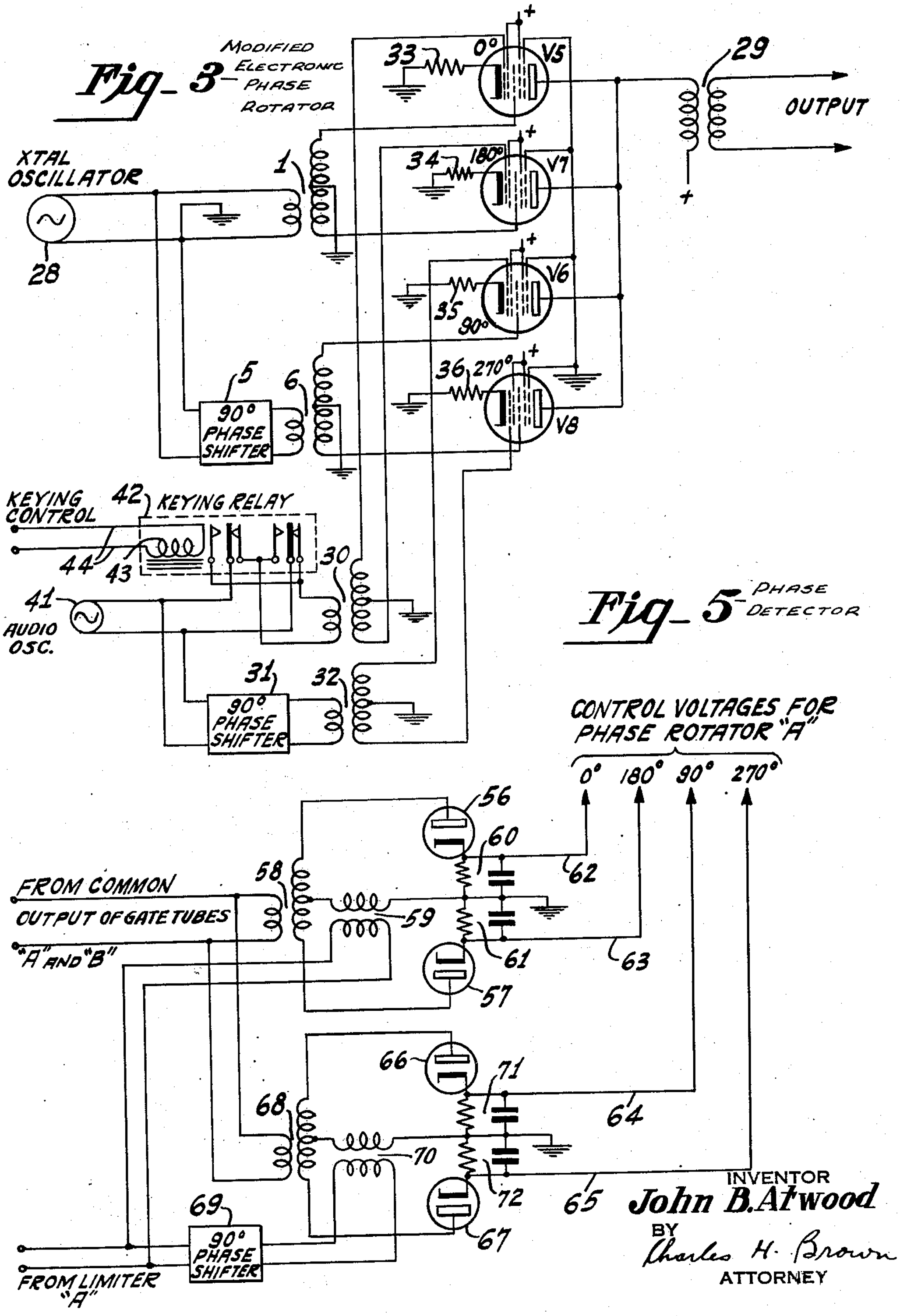
Fig. 3 illustrates a modified electronic phase rotator, used in an FSK telegraph transmitter.
Fig. 5 is a circuit diagram of one of the phase detectors utilized in Fig. 4.

The objects of this invention are accomplished, briefly, in the following manner: By means of a phase splitting arrangement, an IF or HF voltage is to be varied in frequency or phase is separated into four quadrantally-related voltages, that is, into four voltages at 90 electrical degrees with respect to each other. These voltages are applied separately to the respective inputs of four electronic devices which act in effect as switches and have a common output. A lower frequency control voltage is separated into four quadrantally-related voltages which are applied separately as control voltages to the same four electronic devices. If this lower frequency voltage is of audio frequency, the devices are activated in succession at the audio rate to produce a continuous phase rotation of the higher frequency voltage, thus producing an output frequency which differs from the higher frequency by the amount of the audio frequency, the direction of the phase rotation determining whether the output frequency is the sum or difference of the two frequencies. If the lower frequency voltage is a slowly-varying direct voltage responsive to the phase difference between two voltages, then the phase of the higher frequency voltage may be rotated by the action of the electronic devices to maintain such voltage in phase with another voltage with which it is being compared.

Fig. 1 illustrates a mechanical phase rotator, showing the basic principle of the invention, along with the circuit for keeping the two signals in phase. As indicated, the arrangement of Fig. 1 may be used in connection with two IF inputs A and B which are to be selectively gated by means of gate tubes, and each IF output A and B is fed to a separate respective gate tube. To eliminate switching transients, the respective outputs A and B, as applied to the gate tubes, must be kept in phase with each other at all times.

IF input A is applied to the primary winding of a grounded centertapped-secondary transformer 1. Opposite ends of the secondary winding of transformer 1 are coupled to two opposite stator plates 2 and 3 of a quadrantal differential capacitor 4 having four stator plates and a rotor or rotating pickup plate. Plates 2 and 3 receive voltages at a phase relationship of 180 degrees with respect to each other, since they are connected to opposite ends of a grounded center-tapped transformer secondary winding; the notation 0° may therefore be applied to plate 2 and the notation 180° may be applied to plate 3.

IF input A is also applied through a 90° phase shifter 5 to the primary winding of a grounded centertapped-secondary transformer 6. Opposite ends of the secondary winding of transformer 6 are coupled to the other pair of opposite stator plates 7 and 8 of capacitor 4. Plates 7 and 8 receive voltages at a phase relationship of 180 degrees with respect to each other, since they are connected to opposite ends of a grounded center-tapped transformer secondary winding; since the primary of transformer 6 is supplied through a 90° phase shifter from input A, these plates 7 and 8 may be labeled 90° and 270° as related to the degree values applied ot plates 2 and 3. Thus, the relative phases of successive stator plates 2, 7, 3 and 8 are as indicated by the notations 0°, 90°, 180° and 270°.

The rotor plate 9 of capacitor 4 is connected to one terminal 10 for output A, the other terminal 11 being grounded. Thus, the IF wave from the terminals of input A may be impressed on the output terminals 10 and 11 in any desired relative phase. In other words, the pick-up plate 9 may be rotated to abstract from input A any phase desired and provides for a continuous change in the phase of the output with respect to the input. Rotor plate 9 is driven from a motor 13 by means of a shaft 12. Motor 13 is a reversible motor which is controlled in a manner to be described hereinafter.

IF input B is applied to input terminals 14 and 15, terminal 15 being grounded, and terminal 14 is connected directly to terminal 16 for output B, so that input B appears unchanged across terminals 16 and 11 for output B. As indicated, output A between terminals 10 and 11 is applied to one gate tube and output B between terminals 11 and 16 is applied to another gate tube. It is these two outputs A and B which must be maintained in phase at the output terminals (connected to the switching or gating devices) in order to eliminate switching transients.

A phase comparing device or phase detector 17 is utilized to compare the phases of the two outputs, and this device energizes motor 13 to drive rotor plate 9 in accordance with the phase difference between the two outputs. The phase comparing device may be of the form shown, for example. A portion of output A is abstracted from terminals 10 and 11, passed through a 90° phase shifter 18 and applied antiphasally by means of a transformer 19 to the anodes 20 and 21 of a pair of diode discharge devices 22 and 23. A portion of output B is abstracted from terminals 14 and 15 (or from terminals 16 and 11) and applied cophasally to anodes 20 and 21 through a transformer 24 and the center tap of the secondary of transformer 19. A parallel resistance-capacitance network 25 is connected between the cathode of device 22 and the other end of the secondary of transformer 24, while a similar network 26 is connected between the cathode of device 23 or ground and said other end of the secondary of transformer 24. The output of detector 17 is applied to a control circuit for motor 13 by means of a pair of leads 27 connected to such circuit, one of these leads being connected to the cathode of device 22 and the other of these leads to ground or the cathode of device 23.

The phase detector 17 is substantially similar to the conjugate-input phase detector described in Pomeroy Patent #2,288,025, dated June 30, 1942. The output potential between leads 27, that is, the potential between the two cathodes, will be a direct potential having a value determined by the phase relation of the two inputs to the phase detector. When these two inputs have a phase quadrature relation, the resultant or output direct potential has zero value. The 90° phase shifter 18 is provided to shift the phase of output A by 90°, so that when the outputs A and B at terminals 10, 11 and 16, 11 respectively are in phase, the direct potential output of detector 17 has zero value. Under these conditions, then, the motor 13 will be unenergized and rotor 9 will remain stationary. With the cathode of one of the diodes (as shown, diode 23) grounded, the phase detector 17 provides zero direct potential output also when the outputs A and B are 180° out of phase, as well as when they are in phase. This may be undesirable in some cases and is one of the difficulties which is overcome by the electronic system to be described hereinafter.

The motor control circuit or motor drive unit in 13 is preferably of the type illustrated and described in Fig. 1 of the copending Trevor application, Serial No. 161,305, filed May 11, 1950, including the tubes 71, 72, 30, 31 and 44 of such application. Said Trevor application issued as Patent No. 2,644,035 on June 30, 1953.

The direct potential output of detector 17 has a value which is a function of the relative difference of phase of the outputs A and B at terminals 10, 11, 16. The relative polarity of this direct potential output corresponds to the relative phase direction of output A with respect to output B, that is, whether output A lags or leads output B. Now, as the phase difference of outputs A and B varies from 0° or from 180°, the direct potential output then produced by detector 17 will be applied by means of leads 27 to control motor 13 so as to cause it to rotate in one direction or the other to rotate rotor plate 9 in the proper direction to change the phase of output A with respect to input A, thereby bringing outputs A and B back to a phase difference of 0° or 180°, at which time the output of phase detector 17 will be zero and motor 13 will stop. In this way, the rotor plate 9 is driven in accordance with the phase difference between outputs A and B, and the A output is maintained in phase or in antiphase with the B output. Then, switching between outputs A and B may be performed without substantial transients (provided the phase difference is 0°); such transients would be produced if the two outputs were not in phase when switching occurred.

I have found that the system illustrated in Fig. 1 has a certain amount of mechanical inertia and is not capable of responding rapidly enough to counteract the phase changes normally encountered, which do occur rather rapidly. Also, as previously described, there is an ambiguity in the response of phase detector 17, due to the fact that zero output is provided for either zero or for 180° phase relation of outputs A and B. To overcome these deficiencies in the Fig. 1 arrangement, I have devised an electronic phase shifter or phase rotator which replaces the motor and special capacitor of Fig. 1 with tubes.

Fig. 2 illustrates an electronic phase rotator according to this invention, as it might be arranged for an RFCS radiophoto transmitter. In this figure, elements the same as those in Fig. 1 are denoted by the same reference numerals. The four vacuum triodes V1, V2, V3 and V4 take the place of the four stationary plates 2, 7, 3 and 8, respectively, of the capacitor of Fig. 1 and their respective grids are fed voltages having the relative phases marked, through a transformer and phase shifter arrangement exactly the same as that of Fig. 1, from a crystal oscillator 28 which corresponds to input A in Fig. 1. Oscillator 28 may, for example, have a frequency of 5,000,000 cycles.

The anodes of all of the tubes V1, V2, V3 and V4 are connected together and to the primary winding of an output transformer 29, through which winding anode potential is supplied to such anodes. This parallel connection of all the anodes corresponds roughly to the rotor plate 9 of the mechanical analogy of Fig. 1. In Fig. 1, if the rotor plate is centered on the stator plate marked 0°, then the phase of the output A is the same as the phase of the input A. In Fig. 2, if tube V1 (marked 0° at its grid) is made to conduct, then the phase of the output at transformer 29 is the same as the phase of the crystal oscillator 28 input.

In Fig. 1, if the rotor plate 9 is rotated by the motor 13 at one revolution per second, then the frequency of output A will be shifted by one cycle per second, the output A frequency increasing or decreasing in dependence upon the direction of rotation of such rotor plate. That this is true may be seen by considering the fact that one revolution of the rotor plate 9 causes the phase of output A to shift with respect to input A through 360 electrical degrees, which is equivalent to one cycle. Similarly in Fig. 2, if the signal voltage on the tubes V1, V2, V3 and V4 is varied in a sine wave fashion and in such a manner that they conduct in the order of the phase rotation of the signal voltage applied, that is, in the order V1, V2, V3, V4, V1, V2, etc., then the output frequency at 29 will be changed.

Frequency shifted audio tone input derived from the radiophoto transmitting machine, which tone may vary between the values of 1500 cycles and 2300 cycles in accordance with the picture shading, is applied to the primary winding of transformer 30 and is also applied, through a 90° phase shifter 31, to the primary winding of another transformer 32. The secondary winding of transformer 30 is grounded at its center tap and the opposite ends thereof are connected through respective resistors 33 and 34 to the respective cathodes of tubes V1 and V3. The secondary winding of transformer 32 is grounded at its center tap and the opposite ends thereof are connected through respective resistors 35 and 36 to the respective cathodes of tubes V2 and V4. Resistors 33, 34, 35 and 36 are utilized to provide proper operating bias for the tubes. By means of the transformer-phase shifter arrangement 30—32, the audio frequency voltage is split up into four quadrantally-related voltages which are applied to the cathodes of tubes V1, V2, V3 and V4 with the phase relation indicated adjacent the grid of each tube. In this way, the tubes are caused to conduct in the order of the phase rotation, that is, in the order V1, V2, V3, V4, V1, V2, etc.

The tubes are initially balanced as regards oscillator 28 so that with no idle tone present, there is negligible output at 29. In this respect, the action of Fig. 2 differs from that of Fig. 1. The output of tube V1 is balanced against the output of tube V3 and the output of tube V2 is balanced against that of V4. Now, if for example tube V3 is unbalanced, then the output at 29 will be the crystal oscillator frequency of 180° phase. So, the effect produced by the audio frequency tone input corresponds to that produced by the mechanical rotation of the rotor plate in Fig. 1. The effective direction of phase rotation can be reversed by reversing the connections to transformer 30 or to transformer 32.

With a constant frequency audio tone input, the output frequency at 29 will be either increased or decreased by the frequency of the tone input, according to the direction of the phase rotation effective on the tubes V1 to V4. If the input tone frequency is varied, the output frequency at 29 will also vary, so that if the input tone frequency is obtained from a radiophoto machine the output frequency will be shifted in frequency in accordance with the picture tone signal. An illustration will make this clearer. Assume that crystal oscillator 28 has a frequency of 5,000,000 cycles. Also assume that the audio tone input is 2,300 cycles, corresponding to solid black in the picture. Then the frequency at 29 will be either 5,002,300 cycles or 4,997,700 cycles, depending on the direction of phase rotation effective on the tubes. Let us assume it is 5,002,300 cycles. If the audio tone input is now changed to 1500 cycles, corresponding to solid white in the picture, the frequency at 29 will be 5,001,500 cycles. In this way, a frequency shifted RF carrier is produced simply and directly, without the necessity of converting the audio tone input to D. C. to operate a reactance tube, which latter was the general practice in prior arrangements.

Capacitor 37 is connected from the cathode end of resistor 33 to ground. Capacitor 38 is connected from the cathode end of resistor 34 to ground. Capacitor 39 is connected from the cathode end of resistor 35 to ground. Capacitor 40 is connected from the cathode end of resistor 36 to ground. Capacitors 37, 38, 39 and 40 are RF bypass capacitors which keep the RF out of the audio portion of the circuit.

The 90° phase shifter 31 must provide 90° phase shift over the entire range of audio frequencies to be used. It could be, for example, of the type described in an article entitled "Wide band phase shift networks," by R. B. Dome, Electronics, December, 1946. The phase shifter 5 can be of any conventional type, since it has to provide the desired phase shift at only one frequency, that of fixed-frequency oscillator 28.

Fig. 3 shows the electronic phase shifter or phase rotator of the invention in an arrangement suitable for an FSK telegraph transmitter. In this arrangement, tubes of the pentagrid converter type having two grids suitable for control purposes, such as type 6SA7, are utilized. The carrier frequency is applied to one of these grids and the audio frequency to the other. The crystal oscillator frequency derived from oscillator 28 is fed by means of centertapped transformer 1 to grid #3 of tube V5 with a relative phase of zero degrees and to grid #3 of tube V7 with a relative phase of 180°. By means of 90° phase shifter 5 and centertapped transformer 6, the crystal oscillator frequency is fed to grid #3 of tube V6 with a relative phase of 90° and to grid #3 of tube V8 with a relative phase of 270°. The anodes of tubes V5, V6, V7 and V8 are connected together and to the primary winding of an output transformer 29.

In Fig. 3, the frequency shifted audio tone derived from a radiophoto machine, which is used as audio frequency input in Fig. 2, is replaced by an audio frequency oscillator 41 and a keying relay 42. Relay 42 is operated by means of a winding 43 which is supplied with telegraph keying potentials or keying control potentials by means of leads 44 connected to a suitable source of telegraphic signals. Audio frequency oscillator 41 is connected to the fixed contacts of relay 42 and the movable contacts of this relay are interconnected and connected to the primary winding of transformer 30 in the manner illustrated, so that the connections from oscillator 41 to such primary winding are opposite for the two positions of the relay. In other words, the connections from oscillator 41 to transformer 30 for one position of relay 42 are reversed as compared to the transformer connections for the other position of said relay. The opposite ends of the centertapped secondary of transformer 30 are connected to the #1 grids of tubes V5 and V7.

Audio frequency output from oscillator 41 is also supplied through a 90° phase shifter 31 to the primary winding of transformer 32 and the opposite ends of the centertapped secondary of this transformer are connected to the #1 grids of tubes V6 and V8. In this way, the #1 grids of tubes V5, V6, V7 and V8 are supplied with audio frequency voltages which are respectively separated by 90°.

The operation of the Fig. 3 arrangement is similar to that of the Fig. 2 arrangement previously described, the main difference between the two arrangements being that in Fig. 3 the audio tones are applied to the #1 grids, rather than to the cathodes as in Fig. 2. The relay 42 operates to reverse the connections to transformer 30 and thereby operates to reverse the effective direction of phase rotation. Therefore, the output frequency at 29 varies in opposite directions for the two positions of relay 42. In one position of the relay, the output frequency at 29 is the sum of the frequencies of oscillators 28 and 41 and in the other relay position the output frequency is the difference of the frequencies of oscillators 28 and 41. Therefore, the output frequency is shifted by twice the frequency of the audio oscillator 41 when relay 42 operates. Therefore, the amount of frequency shift may be adjusted in a simple manner, that is, merely by varying the frequency of audio oscillator 41.

An example will make the foregoing clearer. Again assume that oscillator 28 has a frequency of 5,000,000 cycles and also assume that an FSK output having a frequency shift of 850 cycles is desired. In this case, the audio oscillator 41 will be adjusted to a frequency of 425 cycles. When the keying relay 42 is in one position in response to one type of telegraphic signal applied at 44, the output frequency at 29 will be 5,000,425 cycles. When the keying relay 42 is operated to its other position in response to the other type of telegraphic signal applied at 44, the connections to transformer 30 are reversed, the effective direction of phase rotation of tubes V5, V6, V7 and V8 is reversed and the output frequency at 29 will then be 4,999,575 cycles. Thus, the desired 850 cycle shift is produced merely by reversing the direction of phase rotation by reversing the connections to transformer 30. The output at 29 shifts from 5,000,425 cycles to 4,999,575 cycles and back, in accordance with the telegraphic signals applied at 44, and the total frequency shift is twice the frequency of oscillator 41.

The relay 42 is shown as being mechanical, but this showing is merely for purposes of simplicity. The keying relay 42 need not be a mechanical relay, but could be an electronic relay.

The keying arrangement of Fig. 3 can also be utilized in a circuit such as that of Fig. 2, wherein the audio tones are applied to the cathodes of the tubes, rather than to the grids as in Fig. 3.

Figure 4:
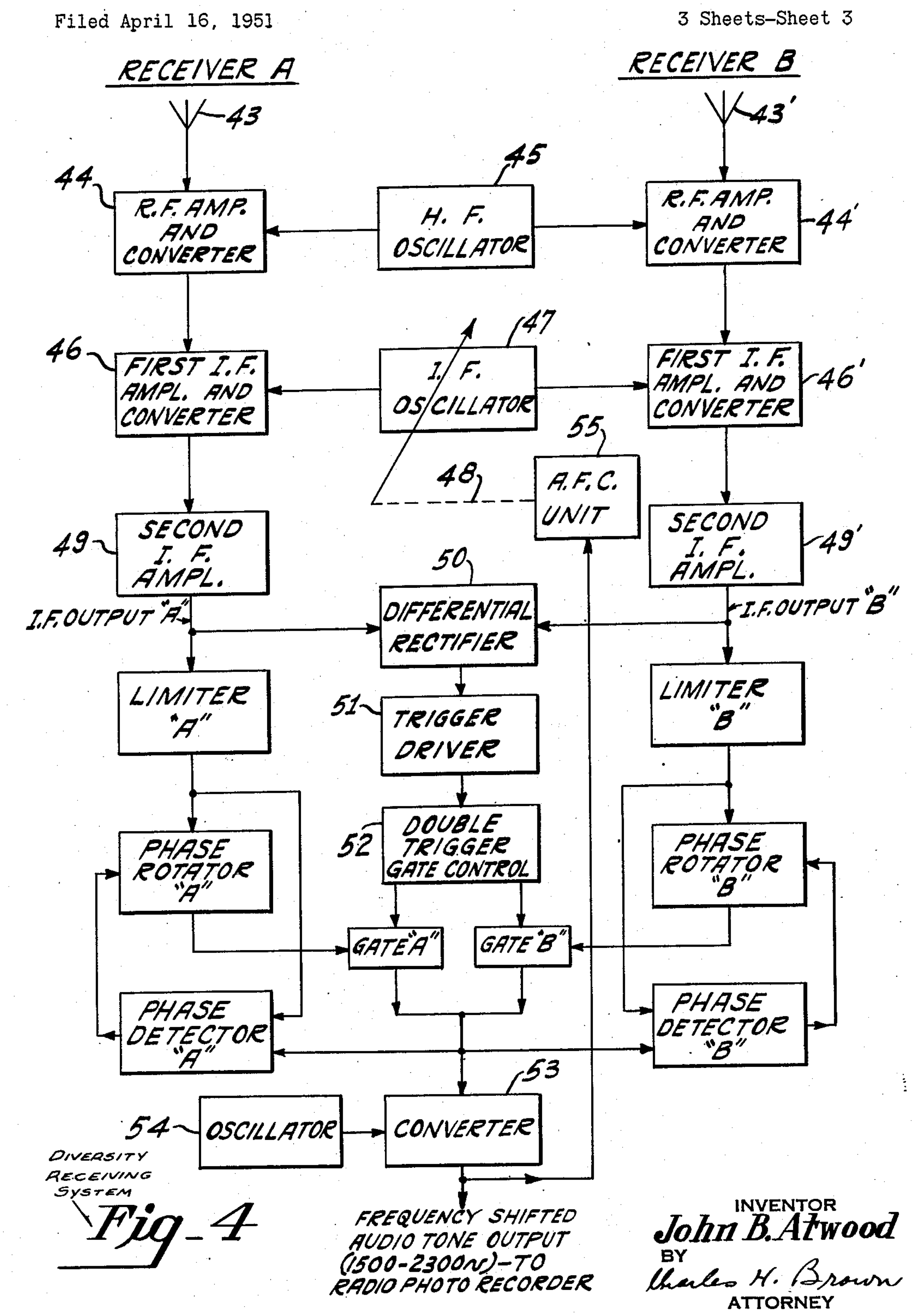
Fig. 4 is a block diagram illustrating the use of phase rotators of this invention in a diversity receiver.

Fig. 4 is a block diagram of a diversity receiver for radiophoto signals, utilizing this invention. Referring to this figure, the diversity receiver system is rather similar to that disclosed in my above-mentioned copending application, Serial No. 118,618, and begins with two receiving antennas 43 and 43' which are in space or polarization diversity as regards a distant transmitting station and which pick up different versions of the RFCS radiophoto signal transmitted from such distant station. The antenna 43 of receiver A feeds RF amplifier 44 while antenna 43' of receiver B feeds RF amplifier 44'. The RF amplifiers 44 and 44' are of the heterodyne type having a common high frequency oscillator 45 coupled thereto and include converters, whereby the incoming RF carrier is converted or heterodyned down to a mean first IF such as 450 kilocycles. This first IF in each receiver is amplified in the first IF amplifiers 46 and 46', respectively, which are of the heterodyne type having a common IF oscillator 47 coupled thereto and include converters whereby the first IF is converted or heterodyned down to a mean second IF of 50 kilocycles, for example. Oscillator 47 is adapted to have its frequency controlled by external means, as indicated at 48. The two versions, of second IF, are amplified in the second IF amplifiers 49 and 49', respectively.

The two versions, having a mean frequency of 50 kilocycles (in the IF range) with a maximum total frequency shift of 800 cycles, are fed through respective limiters A and B. Limiters A and B are preferably as illustrated in my joint Patent #2,515,668, dated July 18, 1950.

IF signals are fed from the outputs of amplifiers 49 and 49' to a common differential rectifier 50 wherein their magnitudes are compared and a resultant potential the magnitude of which indicates which receiver channel, A or B, has the better signal, is developed. This differential rectifier is preferably arranged as in said joint Patent #2,515,668, to be referred to hereinafter as the Schock et al. patent. This potential controls a trigger or locking circuit driver or control stage 51 for a double trigger or locking stage 52 which opens gate A or gate B.

The output of limiter A is fed through phase rotator A to gate A, while the output of limiter B is fed through phase rotator B to gate B. The units consisting of limiter A, limiter B, rectifier 50, driver 51, gate control 52, gate A and gate B are substantially the same as the similar elements disclosed in the Schock et al. patent, except that in the present arrangement transformer coupling is preferably used, in place of the RC signal coupling circuits shown in said patent. The gating arrangement of Fig. 4 operates quite similarly to that of said patent. The opened gating stage supplies output to a common output circuit comprising a converter 53 which is of the heterodyne type having an oscillator 54 coupled thereto. Converter 53 heterodynes the IF down to a center or mean frequency of 1,900 cycles, so that the output of such converter is audio tone which is frequently shifted or which varies from 1,500 to 2,300 cycles in accordance with the signal intelligence or picture values. The converter output supplies 2,300 cycles as the "black frequency" and 1,500 cycles as the "white frequency" to the radiophoto recorder at the central office.

An AFC unit 55 has its input coupled to the output of the converter 53, to sample the same. This unit 55 is preferably constructed and arranged as disclosed in my copending application, Serial No. 119,971, filed October 6, 1949, now Patent No. 2,667,579, dated January 26, 1954, and operates by means of control coupling 48 (which controls the frequency of IF oscillator 47) to maintain the "black frequency" in the receiver output at its proper value of 2,300 cycles.

The signal strength comparing means and gate control means operates in the following manner: If receiver A gets the better signal gate A is opened up and gate B is closed, while if receiver B gets the better signal gate A is closed and gate B is opened up.

A phase detector A is coupled to receive wave energy from the output of limiter A and from the common output of gates A and B, these two energies providing inputs for such phase detector. The output of detector A provides control voltages for phase rotator A. A phase detector B is coupled to receive wave energy from the output of limiter B and from the common output of gates A and B, these two energies providing inputs for such phase detector. The output of detector B provides control voltages for phase rotator B. Generally, Fig. 4 operates in the following manner. The differential rectifier, trigger driver and double trigger gate control cause either gate A or gate B to be opened, depending on which of signals A or B is the stronger, and cause the other gate to be closed. The selected output (either signal A or signal B) is used to condition the phase of the signal which the gates will select next (either signal B or signal A) so that it will be in phase with the selected signal at the gates when switching occurs. As a result, switching transients, due to out-of-phase relation of the signals when switching takes place, are eliminated. Thus, when the selected output is signal A, the phases of signals A and B are compared in phase detector B and the phase of signal B is corrected by phase rotator B to bring signal B at gate B into phase with signal A at gate A. In other words, the B signal on the grid of the nonconducting gate tube (gate B) is held in phase with the A signal on the conducting gate tube (gate A). When the selected output is signal B, the phases of signals B and A are compared in phase detector A and the phase of signal A is corrected by phase rotator A to bring signal A at gate A into phase with signal B at gate B. The manner in which the above action takes place will become clearer as the description proceeds.

First, assume that signal A is the stronger of the two signals. It then passes through open gate A and becomes the selected output. Considering the A side of the circuit, phase detector A compares the phase of the output of limiter A with the phase of the selected output; since the selected output is also signal A, there is zero phase difference between the two compared signals and the output of phase detector A controls phase rotator A so that the output of phase rotator A is also of zero phase. How this control of phase rotator A is accomplished will be explained hereinafter. For reference purposes, assume that the output of phase rotator A (input of gate A) under these conditions is zero degrees phase.

Now consider the B side of the Fig. 4 circuit and assume that momentarily there is 180° difference in phase between the A and B signals at the limiter outputs. Phase detector B compares the phase of the selected output (signal A under the assumed conditions) with the phase of the output of limiter B and finds this 180° phase difference which was assumed. Phase detector B then controls phase rotator B in such a manner that phase rotator B produces a 180° shift in phase of the B signal on the lead going to gate B. The B signal appearing on this lead is thus in phase (zero phase difference) with the A signal at gate A. Thus, when the B signal becomes stronger than the A signal and gate B is opened and gate A closed, there is no change of phase of the selected output signal out of the gates, since the two available inputs to the gates are then in phase.

Now, we will examine the conditions immediately following gating on of the B signal. Just before gating, the two inputs to phase detector B (the selected output signal A and the output of limiter B) were 180° out of phase, since the assumed conditions were that there was 180° phase difference between the A and B signals. Just after gating, the two inputs to phase detector B (the selected output signal B as it appears at gate B and the output of limiter B) will still be 180° out of phase, since phase rotator B is now acting to produce a 180° shift in phase of the B signal passing therethrough. Side B thus remains in the same condition as existed before gating. The same applies to side A. So, the conditions have become stabilized and will remain in this relation until there is a change in the relative phases of the A and B signals, at the limiter outputs, from the assumed relation of 180° phase difference.

If the phase of signal A at the limiter A output now changes from the reference zero degrees to 90°, phase detector A will compare the phases of the selected output signal B (which is at the reference zero degrees phase due to the action previously described) and of limiter A's output (now at 90° phase). The output of phase detector A will then control the phase rotator A so that it introduces a 90° correction into the signal passing therethrough; the phase of the A signal on the lead from phase rotator A to gate A will then be zero degrees. The manner of operation of the phase detectors and phase rotators will become clearer as the description proceeds.

Let us now examine phase detector A. This is shown in Fig. 5. All of Fig. 5 is contained in the block labeled phase detector A in Fig. 4. The phase detector B is exactly similar, so that all of Fig. 5 is duplicated in the block labeled phase detector B in Fig. 4. From an inspection of Fig. 5, it may be noted that phase detector A actually consists of two separate diode phase detector circuits each of which is essentially similar to the phase detector 17 in Fig. 1. Part of the common output of gate tubes A and B is fed antiphasally to the anodes of two diodes 56 and 57 by means of a transformer 58. A portion of the output of limiter A is fed cophasally to the anodes of diodes 56 and 57 by means of a transformer 59. A parallel resistance-capacitance network 60 is connected between the cathode of diode 56 and ground, while a similar network 61 is connected between the cathode of diode 57 and ground. The output of the double-diode circuit described is taken off by a pair of leads 62 and 63, lead 62 being connected to the cathode of diode 56 and lead 63 being connected to the cathode of diode 57.

Another part of the common output of gate tubes A and B is fed antiphasally to the anodes of two diodes 66 and 67 by means of a transformer 68. Another portion of the output of limiter A is fed to a 90° phase shifter 69, the output of which is fed cophasally to the anodes of diodes 66 and 67 by means of a transformer 70. A parallel resistance-capacitance network 71 is connected between the cathode of diode 66 and ground, while a similar network 72 is connected between the cathode of diode 67 and ground. The output of the double-diode circuit 66, 67, etc., is taken off by a pair of leads 64 and 65, lead 64 being connected to the cathode of diode 66 and lead 65 being connected to the cathode of diode 67.

From the foregoing description, it may be noted that the two inputs to phase detector A of Fig. 5 comprise the output of limiter A and the common output of gates A and B, which latter signal is, of course, either signal A or signal B as selected by the gate control means. The phase detector A provides four control or output voltages in leads 62, 63, 64 and 65, these control voltages being utilized to control the phase rotator A. Lead 62, as indicated by the notation in Fig. 5, is for zero degrees, lead 63 is for 180°, lead 64 is for 90° and lead 65 is for 270°. These phase voltages result from the utilization of the 90° phase shifter 69 in the connection between one of the double-diode circuits and the output of limiter A. The four control voltages provided by the output of phase detector A in Fig. 5 correspond to the control voltages or signal voltages produced at the secondary sides of transformers 30 and 32 in Fig. 2 or 3.

The phase detector B is preferably exactly similar to the phase detector A illustrated in Fig. 5, but is supplied with input voltages derived from the common output of gates A and B (in other words, either signal A or signal B) and from limiter B. The four output leads of phase detector B, corresponding to leads 62–65, supply four control voltages for controlling phase rotator B. These control voltages provided by the output of phase detector B again correspond to the control voltages or signal voltages produced at the secondary sides of transformers 30 and 32 in Fig. 2 or 3.

The following table shows the relative voltages existing on the four leads 62, 63, 64 and 65 for various phase relationships between the selected output (that is, the common output of gates A and B) and the particular limiter output, which in the case of phase detector A would, of course, be the output of limiter A. These voltages are not necessarily the voltages that would be used in an actual circuit, but indicate in a general way, for purposes of explanation, relative voltages that might be used. From the following table, it may be seen that the relative amplitudes of the four control voltages produced on leads 62, 63, 64 and 65 are dependent upon the phase relation of the two signals being compared in the phase detector.

| Relative Phase, Degrees | Voltage on Lead | | | |
|---|---|---|---|---|
| | 62 | 63 | 64 | 65 |
| 0 | 2.0 | 0 | 1.41 | 1.41 |
| 45 | 1.85 | 0.77 | 1.85 | 0.77 |
| 90 | 1.41 | 1.41 | 2.0 | 0 |
| 135 | 0.77 | 1.85 | 1.85 | 0.77 |
| 180 | 0 | 2.0 | 1.41 | 1.41 |
| 225 | 0.77 | 1.85 | 0.77 | 1.85 |
| 270 | 1.41 | 1.41 | 0 | 2.0 |
| 315 | 1.85 | 0.77 | 0.77 | 1.85 |
| 360 | 2.0 | 0 | 1.41 | 1.41 |

The voltages in the preceding table are positive with respect to ground. For a fixed phase relationship of the two inputs to the phase detector, these are steady direct voltages. The four bypass capacitors across the four diode load resistors of networks 60, 61, 71 and 72 are only of sufficient size to bypass the input frequencies; they do not bypass low audio frequencies. As an example, in the system of Fig. 4 propagation characteristics may cause the relative phase of signals A and B to vary at a rate of 360×20 or 7,200° per second for short intervals. This means that, during these intervals, there is an actual difference in frequency of 20 cycles per second between the two signal versions received from the same transmitter. When this condition occurs, the voltage appearing on each of the four leads 62, 63, 64 and 65 will be similar in appearance to the output of an ordinary full-wave rectifier, with the difference that each half-cycle will occupy the full 360 degrees. These half-cycles would occur at a 20-cycle rate, for this illustration. The bypass capacitors in networks 60, 61, 71 and 72 are not large enough to bypass frequencies of this order of magnitude.

The half-cycles appearing on the four leads 62, 63, 64 and 65 are identical in shape and are displaced in time from each other by 90°. Their cyclic rotation can occur in either direction, depending on whether the frequency of the one signal is higher or lower than that of the other signal, used as a reference.

Since the circuit of Fig. 5 produces only half-sine waves for the control voltages of the phase rotator as described, there will be produced on the output of the phase rotator a small component of the fourth harmonic of the rotation frequency, which will produce a maximum error of ±8° in the phase. If warranted, this can be eliminated by using phase detectors which put out full sine wave control voltages, but it will double the number of components in the phase detectors.

Let us now consider the phase rotators. Each phase rotator A and B of Fig. 4 comprises four multigrid tubes connected and arranged as in Fig. 3. The crystal oscillator 28 of Fig. 3 would be replaced by the corresponding limiter output of Fig. 4. For example, the output of limiter A would be fed through a pair of centertapped transformers, corresponding to transformers 1 and 6 in Fig. 3, to the #3 grids of the corresponding tubes of phase rotator A, the feed through one transformer being through a 90° phase shifter. In this way, the four quadrantally-related IF signal voltages are provided for phase rotator A. By similar connections, four quadrantally-related IF signal voltages, derived from limiter B, are provided for phase rotator B.

For the Fig. 4 system, the four leads from transformers 30 and 32 would be replaced by the four leads 62, 63, 64 and 65 of Fig. 5.

The four tubes such as V5, V6, V7 and V8 of each phase rotator A and B are initially adjusted with zero volts on each of the four control leads from the corresponding phase detector and with a signal appearing at the output of the corresponding limiter; they are balanced to a condition of zero output. The zero and 180° tubes can be balanced for no net output as a pair, while the 90 and 270° tubes can be balanced for no net output as a pair. This can be accomplished by a change in the size of a bias resistor or by a change in one of the various grid voltages.

Now, the application of the control voltages from each phase detector will always unbalance the corresponding phase rotator and allow an output to appear. The four control voltages from each phase detector must be applied to the corresponding phase rotator in proper cyclic order to produce a phase correction. The four multigrid tubes in Fig. 3 have degree markings. For the purposes of Fig. 4, these can be considered as applying to the #3 grid of each corresponding tube. Then lead 62 of Fig. 5 would be connected to the #1 grid of tube V5, lead 63 to the #1 grid of tube V7, lead 64 to the #1 grid of tube V8 and lead 65 to the #1 grid of tube V6.

At this point, let us return to the description of operation under the initial conditions previously referred to—that is, with signal A the stronger and being the selected output signal at the common output of gates A and B. Under these conditions, phase detector A compares signal A (selected output) with limiter A output and finds zero phase difference between these two waves. From the foregoing table, we find that for zero degrees phase, equal voltages appear on leads 64 and 65. Hence, the outputs of tubes V8 and V6 (to which leads 64 and 65 are respectively connected) of the phase rotator cancel each other and produce no net output. Lead 62 has voltage appearing on it and lead 63 does not. Hence, tubes V5 and V7 are unbalanced and a voltage of zero phase (that applied to tube V5 from the limiter A output) appears at the output of phase rotator A.

Under these same assumed initial conditions, phase detector B was comparing two waves having a phase difference of 180°. Again from the table, we find that for 180° phase equal voltages again appear on leads 64 and 65, so that the outputs of tubes V8 and V6 again cancel each other. Lead 63 has voltage appearing on it and lead 62 does not. Hence, tubes V5 and V7 of phase rotator B are unbalanced in the reverse manner and a voltage of 180° phase (that applied to tube V7 from the limiter B output) appears at the output of phase rotator B. This is equivalent to shifting the phase of the limiter B output by 180°, which is what is required to bring the B signal at gate B into phase with the A signal at gate A, a phase difference of 180° between the A and B signals at their respective limiter outputs having been assumed.

It was assumed above that sometime later signal B was selected by the gates and that the phase of signal A then changed from the reference phase of zero degrees to 90 degrees, and more specifically that it advanced 90° with respect to the reference phase. Referring again to the table, for 90° phase equal voltages appear on leads 62 and 63, so that the outputs of tubes V5 and V7 of the phase rotator cancel each other and produce no net output. Lead 64 has voltage appearing on it and lead 65 does not. Hence, tubes V6 and V8 are unbalanced and a voltage corresponding to tube V8 appears on the output of phase rotator A. It must be shown that the output of tube V8 is zero reference phase and not 270°, as the tube is labeled. We have taken as zero reference phase, throughout the foregoing explanation, the phase of the selected output (signal B in this case). We have assumed that the phase of signal A has advanced 90° with respect to the reference phase. The degree labels on the tubes in Fig. 3 are phases relative to the limiter output. But, since the limiter output phase has advanced 90° with respect to our selected output, 90° must be added to the label of each phase rotator tube, to refer such phases to the reference phase. This makes tube V8 have a phase of 270+90 or 360 degrees relative to the selected output (zero reference phase). For switching purposes, this is equivalent to zero degrees, and the phase of signal A at gate A has now been brought back to zero degrees reference phase, the phase of the selected output, signal B, as desired.

Now let us consider one more condition. Let us assume that the phase of signal A at the limiter output has advanced 45° relative to the zero reference phase, the phase of the selected output (still signal B). From the foregoing table, we find that for 45° relative phase, voltage appears on leads 62 and 63, but these voltages are not equal. In the preceding discussion, we have tacitly assumed that the outputs of the phase rotator tubes bear a linear relationship to the voltages on the control leads such as 62—65. The net output of tubes V5 and V7 would then be of phase zero (relative to the limiter output) and of amplitude corresponding to 1.85—0.77 (see table), or 1.08. Similarly, the net output of tubes V6 and V8 is of phase 270° (relative to the limiter output) and of amplitude corresponding to 1.85—0.77 (see table), or 1.08. Combining these two net outputs (of equal amplitudes, one of phase zero and the other of phase 270°), we have for the resultant output a voltage of amplitude corresponding to about 1.53 and having a phase of 315° (or —45°) relative to the limiter output. Since it was assumed that the limiter output had advanced 45°, the phase rotator correction of —45° brings the phase rotator output phase back to zero degrees relative to the selected output of zero reference phase.

The fact that there is a slight difference in amplitude of the phase detector outputs for various phase corrections of the phase rotator is of no significance; it is only the phase angle of this phase detector output that is important.

Similar explanations to those given above apply to conditions in which the signal version which the gates will select next differs in phase by any number of degrees whatever from the selected output of the gates (it is not at all necessary that these two waves differ only by multiples of 45°, as might be assumed from the foregoing table). For any number of degrees of phase difference (either advance or retard) of the next-to-be-selected signal, the appropriate phase detector provides voltages of proper amplitude and proper phase as related to the phases of the signal components applied to the various phase rotator tubes, such that their application to the corresponding phase rotator results in phase corrections which, added vectorially, rotate or correct the phase of the next-to-be-selected signal an amount just proper to bring this signal back to a phase difference of zero degrees relative to the selected output signal of the gates. The operation of the Fig. 4 arrangement under these conditions should now be clear.

It is believed that the foregoing will be a sufficient explanation of the operation of the Fig. 4 system to show that the selected output at the common output of the gates (either signal A or signal B, which ever is the stronger) is used to condition, by means of the respective phase rotator B or A, the phase of the signal which the gates will select next (either signal B or signal A) so that it will be in phase with the selected signal at the gates when switching occurs. In other words, the signal which the gates will select next is corrected automatically, if necessary, so as to have a reference phase of zero degrees. As a consequence, switching transients, which would otherwise result from out-of-phase relation of the signals when switching takes place, are eliminated. Such transients, if they existed, would produce bothersome black or white dots on the received picture when the system of Fig. 4 is being used for radiophoto signal reception.

What I claim to be my invention is as follows:

1. In a diversity receiver, a pair of separate receiving channels in which appear two different versions of a signal being received by said receiver, separate couplings from each signal channel to a gate device which is controllable to pass one or the other of the signal versions to a common output circuit, means for comparing the strengths of the two signal versions and for controlling said gate device to pass the stronger signal version to said output circuit, a phase rotator in at least one of said couplings, said phase rotator comprising means for splitting the corresponding signal version into four quadrantally-related voltages, four electron discharge device structures each having first and second input electrodes and an output electrode, means for respectively applying said four voltages to different ones of said first input electrodes of said discharge device structures, and means for connecting the output electrodes of all said discharge device structures in parallel to a common output circuit coupled to said gate device, at least one phase detector for comparing the signal version passed by said gate device and the signal version corresponding to said phase rotator and for producing four control voltages the relative amplitudes of which are dependent upon the phase relation of the two signals being compared, and means for respectively applying said four control voltages to different ones of said second input electrodes of said discharge device structures, to control conduction in the respective discharge device structures.

2. In a diversity receiver, a pair of separate receiving channels in which appear two different versions of a signal being received by said receiver, separate couplings from each signal channel to a gate device which is controllable to pass one or the other of the signal versions to a common output circuit, means for comparing the strengths of the two signal versions and for controlling said gate device to pass the stronger signal version to said output circuit, a phase rotator in each of said couplings, each phase rotator comprising means for splitting the corresponding signal version into four quadrantally-related voltages, four electron discharge devices each having first and second input electrodes and an output electrode, means for respectively applying said four voltages to different ones of said first input electrodes of said discharge devices, and means for connecting the output electrodes of all said discharge devices in parallel to a common output circuit coupled to said gate device, a first phase detector excited by the signal version passed by said gate device and by the first signal version for producing four control voltages the relative amplitudes of which are dependent upon the phase relation of the two signals by which said detector is excited, means for respectively applying said four control voltages to different ones of said second input electrodes of the discharge devices of the phase rotator excited by said first signal version to control conduction in the respective discharge devices, a second phase detector excited by the signal version passed by said gate device and by the second signal version for producing four control voltages the relative amplitudes of which are dependent upon the phase relation of the two signals by which said second detector is excited, and means for respectively applying said last-named four control voltages to different ones of said second input electrodes of the discharge devices of the phase rotator excited by said second signal version to control conduction in the respective discharge devices.

3. In a diversity receiver, a pair of separate receiving channels in which appear two different versions of a signal being received by said receiver, separate couplings from each signal channel to a gate device, means for controlling said gate device to pass the stronger of the two signal versions to a common output circuit, a phase rotator in at least one of said couplings, said phase rotator comprising means for splitting the corresponding signal version into four quadrantally-related voltages, four electron discharge devices each having input electrodes and also an output electrode, means for applying each of said voltages to an input electrode of a corresponding one of said discharge devices, and means for connecting the output electrodes of all of said discharge devices in parallel to a common output circuit coupled to said gate device, at least one phase detector for comparing the signal version passed by said gate device and the signal version corresponding to said phase rotator and for producing four control voltages the relative amplitudes of which are dependent upon the phase relation of the two signals being compared, and means for applying each of said control voltages to an input electrode of a corresponding one of said discharge devices to control conduction in the discharge devices.

4. In a diversity receiver, a pair of separate receiving channels in which appear two different versions of a signal being received by said receiver, separate couplings from each signal channel to a gate device, means for controlling said gate device to pass the stronger of the two signal versions to a common output circuit, a phase rotator in each of said couplings, each phase rotator comprising means for splitting the corresponding signal version into four quadrantally-related voltages, four electron discharge devices each having input electrodes and also an output electrode, means for applying each of said voltages to an input electrode of a corresponding one of said discharge devices, and means for connecting the output electrodes of all of said discharge devices in parallel to a common output circuit coupled to said gate device, a first phase detector excited by the signal version passed by said gate device and by the first signal version for producing four control voltages the relative amplitudes of which are dependent upon the phase relation of the two signals by which said detector is excited, means for applying each of said control voltages to an input electrode of a corresponding one of the discharge devices of the phase rotator excited by said first signal version to control conduction in these discharge devices, a second phase detector excited by the signal version passed by said gate device and by the second signal version for producing four control voltages the relative amplitudes of which are dependent upon the phase relation of the two signals by which said second detector is excited, and means for applying each of said last-named control voltages to an input electrode of a corresponding one of the discharge devices of the phase rotator excited by said second signal version to control conduction in these last-named discharge devices.

References Cited in the file of this patent

UNITED STATES PATENTS

| Number | Name | Date |
|---|---|---|
| 1,868,945 | Kruesi | July 26, 1932 |
| 1,914,103 | Bjornson | June 13, 1933 |
| 2,042,831 | Crosby | June 2, 1936 |
| 2,143,178 | Wright | Jan. 10, 1939 |
| 2,256,538 | Alford | Sept. 23, 1941 |
| 2,332,253 | Peterson | Oct. 19, 1943 |
| 2,345,933 | Green | Apr. 4, 1944 |
| 2,408,039 | Busignies | Sept. 24, 1946 |
| 2,424,971 | Davey | Aug. 5, 1947 |
| 2,452,675 | Newitt | Nov. 2, 1948 |
| 2,564,682 | Fisk | Aug. 21, 1951 |